United States Patent

Fairchild et al.

[11] Patent Number: 5,864,534
[45] Date of Patent: Jan. 26, 1999

[54] OPTICAL DATA STORAGE DISC HAVING LOW-PROFILE HUB

[75] Inventors: John F. Fairchild, Hugo; John W. Swanson, Maplewood, both of Minn.

[73] Assignee: Imation Corp., Oakdale, Minn.

[21] Appl. No.: 811,209

[22] Filed: Mar. 5, 1997

Related U.S. Application Data

[63] Continuation of Ser. No. 515,136, Aug. 15, 1995, abandoned.

[51] Int. Cl.⁶ .................................. G11B 3/70; G11B 5/84
[52] U.S. Cl. ............................................. 369/290; 360/135
[58] Field of Search .................................... 369/282, 289, 369/291; 360/135

[56] References Cited

U.S. PATENT DOCUMENTS

| | | | |
|---|---|---|---|
| 4,710,913 | 12/1987 | Matsushima et al. | 369/280 |
| 4,827,468 | 5/1989 | Odawara et al. | 369/271 |
| 5,167,996 | 12/1992 | Kurisu et al. | 369/282 |
| 5,265,086 | 11/1993 | Ota et al. | 369/284 |
| 5,323,381 | 6/1994 | Takahashi et al. | 369/282 |
| 5,369,632 | 11/1994 | Takahashi | 369/282 |
| 5,458,940 | 10/1995 | Woo | 360/135 |

FOREIGN PATENT DOCUMENTS

| | | | |
|---|---|---|---|
| 0 475 197 A2 | 3/1992 | European Pat. Off. . | |
| 0 301 829 B1 | 3/1994 | European Pat. Off. . | |
| 0 325 399 B1 | 8/1994 | European Pat. Off. . | |
| 61-170970 | 8/1986 | Japan | 360/135 A |
| 3-263667 | 11/1991 | Japan | 369/290 |
| 5-89515 | 4/1993 | Japan | 369/282 |
| 5-274661 | 10/1993 | Japan | 360/135 |

*Primary Examiner*—Brian E. Miller
*Attorney, Agent, or Firm*—Eric D. Levinson

[57] ABSTRACT

An optical data storage disc comprising a disc-shaped substrate and a centrally-located magnetizable hub. The disc has a central bore configured to receive a drive pin from an optical disc drive. The substrate has a recessed annular portion adjacent its center bore. The hub is provided within the recessed portion of the substrate. The central bore of the disc may be defined by the central bore of the hub alone, so that the diameter of the hub's bore is less than that of the substrate. In the alternative, the central bore of the disc may be defined in part by the inner bores of both the substrate and the hub, in which case those inner bores are of equal diameter. In either case, the thickness of the disc when measured at its inner portion, i.e., in the area of the hub and recessed portion, is equal to the thickness of the substrate at the periphery thereof. By reducing the thickness of the hub area to that of the substrate itself, the number of discs that can be stored together in a fixed space can be increased, thereby increasing the potential storage capacity of an optical disc jukebox or magazine system.

6 Claims, 1 Drawing Sheet

OPTICAL DATA STORAGE DISC HAVING LOW-PROFILE HUB

This is a continuation of application Ser. No. 08/515,136 filed Aug. 15, 1995 now abandoned.

FIELD OF THE INVENTION

The present invention relates generally to optical discs capable of storing data, and more particularly to the hubs of such discs.

BACKGROUND OF THE INVENTION

Writable optical discs may be read or written on by lasers in optical disc drives. Writable optical discs include write-once media, known as WORM (write once, read many), and rewritable media, such as magneto-optical or phase-change media. Such media are usually provided in a cartridge housing (not shown) which protects the media. Alternatively, such discs may be provided without cartridges within a storage system which acts like a jukebox or magazine system by storing and retrieving individual discs within a library of discs.

A typical prior art writable optical disc 10 is shown in FIG. 1. Disc 10 is comprised of a disc-shaped writable medium substrate 12 and a central hub 14. Hub 14, usually comprising a magnetizable metal or metal-filled plastic, is provided at the center of the disc, and defines a central bore 16 through which a drive pin (not shown) of an optical disc drive (not shown) may be inserted. Disc 10 is shown in cross-section in FIG. 2.

As shown in FIG. 2, the outer annular portion of hub 14 is positioned on top of the inner annular portion of substrate 12 so that the combined thickness, $t_1$, of the hub and the inner annular portion of the substrate is greater than the thickness, t, of the substrate, i.e., $t_1>t$.

SUMMARY OF THE INVENTION

Because disc 10 is typically accommodated within a cartridge housing, the fact that the disc is thicker in the area of hub 14 is of little consequence. However, if a jukebox or magazine system of the type described earlier is employed, the number of discs that can be stored, and thus the total storage capacity of the system may be limited by the thickness of the hub. By reducing the thickness of the hub to that of the disc-shaped medium substrate itself, the storage space of the library system may be maximized.

The present invention includes an optical data storage disc comprising a disc-shaped optical storage medium substrate and a centrally-located magnetizable hub. The substrate has a central bore and a thickness t. The substrate has a recessed annular portion adjacent the inner diameter of the disc.

The metal hub is provided within the recessed portion of the substrate. The hub has a central bore which is concentric with the inner bore of the substrate and is configured to receive a drive pin from an optical disc drive. The thickness of the disc when measured at the recessed portion of the substrate (including the hub) is equal to t. The hub may be secured to the substrate by an adhesive layer provided therebetween.

In one embodiment, the diameters of the central bores of the substrate and hub are equal, and the substrate and hub each define a linear portion of the central bore of the disc in the axial direction, e.g., as shown in FIG. 4A. Thus, the drive pin may contact both the hub and substrate. The lengths of the two linear portions of the center bore defined by the substrate and hub are preferably about equal.

In an alternative embodiment, the diameter of the hub's central bore is less than the substrate's, and the central bore of the hub is the same as that of the disc, e.g., as shown in FIG. 4B. Thus, the drive pin may contact only the hub and not the substrate.

The optical data storage disc may be recordable or pre-recorded. The disc may have a diameter of about 90 mm and a thickness, t, of about 1.2 mm.

DETAILED DESCRIPTION

Figure 1:
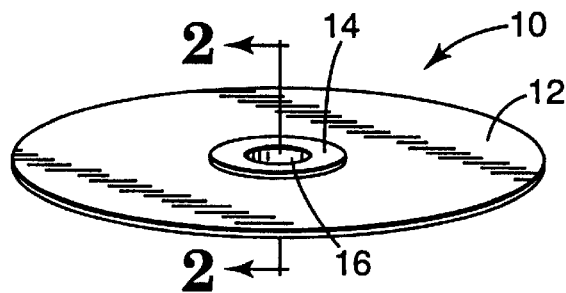
FIG. 1 shows a perspective view of a prior art writable optical disc.
Figure 2:
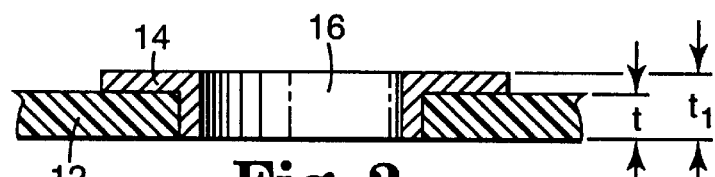
FIG. 2 shows a cross-sectional view of the disc in FIG. 1 taken along line 2—2.
Figure 3:
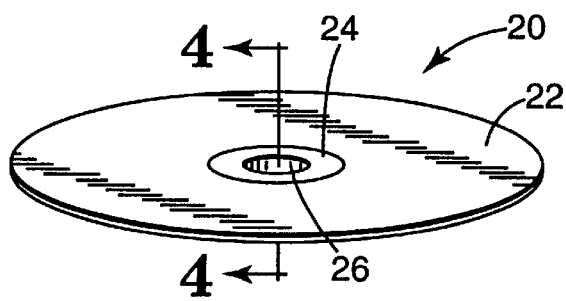
FIG. 3 shows a perspective view of a writable optical disc according to the present invention.

A writable optical disc 20 is shown in FIG. 3. Writable disc 20 is comprised of a disc-shaped writable medium substrate 22 and a central hub 24. Hub 24, comprised of a magnetizable metal or metal-filled plastic, is provided at the center of disc 20, and defines a central bore 26 having a diameter d through which a drive pin (not shown) of an optical disc drive (not shown) may be inserted. Two variations of disc 20 are shown in cross-section in FIGS. 4A and 4B.

Figure 4A:
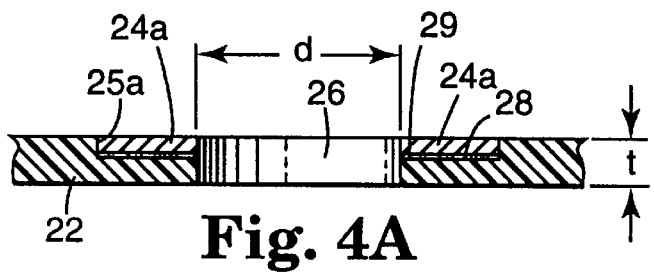
FIGS. 4A and 4B show cross-sectional views of the disc in FIG. 3 taken along line 4—4 according to alternative embodiments of the present invention.

Hub 24 in FIG. 3 is shown as hub 24a in FIG. 4A. Hub 24a is comprised of an annular ring that is provided within an annular recess 25a within substrate 22. An annular ring of adhesive 28 is provided between annular surface 29 of substrate 22 and hub 24a, thereby securing the hub to the substrate. The thickness of the disc in the hub area is equal to the thickness, t, of the substrate at its outer annular portions. In other words, the sum of the thicknesses of medium 22 in the hub area, adhesive 28, and hub 24a should be equal to the thickness, t, of the substrate at its outer annular portions.

If writable optical disc 20 is a magneto-optical disc having a diameter of about 90 mm, then substrate 22 is preferably polycarbonate and preferably has a thickness, t, of about 1.2 mm. Hub 24a preferably has an outer diameter of about 22 mm and an inner bore 26 of about 4 mm. Hub 24a is preferably about 0.6 mm thick and is comprised of stainless steel. Adhesive 28 is about 0.03 mm thick and is preferably an ultraviolet-curable resin, such as an ultraviolet-type epoxy resin. Substrate 22 should not be so thin in the central hub area that it does not provide adequate flow for molding substrate 22, which may cause increased birefringence and irregular molding. This flow problem begins to occur when the thickness of the substrate in the hub area is less than one-half as thick as the substrate at its outer annular portions.

Figure 4B:
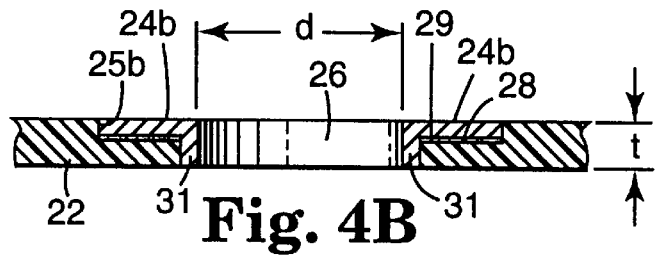

In an alternative embodiment, hub 24 in FIG. 3 is shown as hub 24b in FIG. 4B. Like hub 24a, hub 24b is comprised of an annular ring that is provided within an annular recess 25b within substrate 22. Unlike hub 24a, however, hub 24b has a second annular portion 31 which is located at the inner annular portion of hub 24b and extends in the axial direction along the entire bore 26. As was the case with hub 24a, an annular ring of adhesive 28 is provided between annular surface 29 of substrate 22 and hub 24b, thereby securing the hub to the substrate. The thickness of hub 24b at its inner annular portion is equal to the thickness, t, of substrate 22.

Preferred dimensions and materials for hub 24b and substrate 22 shown in FIG. 4B are the same as for hub 24a and substrate 22 in FIG. 4A, except as follows. Second annular portion 31 of hub 24b has an outer diameter of about 5.2 mm.

Hub 24a may be made and assembled into substrate 22 as follows. Adhesive 28 is applied to annular recess 25a. Hub 24a is positioned into annular recess 25a and adhesive 28 is cured by an ultraviolet light source located at the side of disc 20 opposite the annular recess. Hub 24b may be constructed in a similar manner.

Although the present invention has been illustrated by reference to a writable optical disc, those skilled in the art will appreciate that the present invention may also have application to pre-recorded optical discs.

What is claimed is:

1. An optical data storage disc, the disc having a central bore having a constant diameter, d, throughout the thickness of the disc, comprising:

a disc-shaped optical storage medium substrate bounded by an outer diameter and an inner diameter defining a central bore having a diameter equal to d, the substrate having a thickness, t, wherein the substrate has a recessed annular portion adjacent the inner diameter of the substrate; and a magnetizable hub provided within the recessed portion of the substrate, the hub having an inner diameter defining a central bore concentric with the central bore of the substrate, wherein the central bore of the hub has a diameter equal to d.

wherein the substrate and hub each define a linear portion of the central bore of the disc in the axial direction, and wherein the thickness of the disc measured at the central bore is equal to t.

2. The disc of claim 1, wherein the lengths of the linear portions of the center bore defined by the substrate and hub are approximately equal.

3. The disc of claim 1, further comprising an adhesive layer provided between the hub and the substrate.

4. The disc of claim 1, wherein the disc is recordable.

5. The disc of claim 1, wherein the disc has an outer diameter of about 90 mm and wherein t equals about 1.2 mm.

6. The disc of claim 1, wherein the hub is made of stainless steel.

* * * * *